J. A. TYCHON.
SPREADER FOR REINS.
APPLICATION FILED AUG. 10, 1911.
1,022,985.
Patented Apr. 9, 1912.
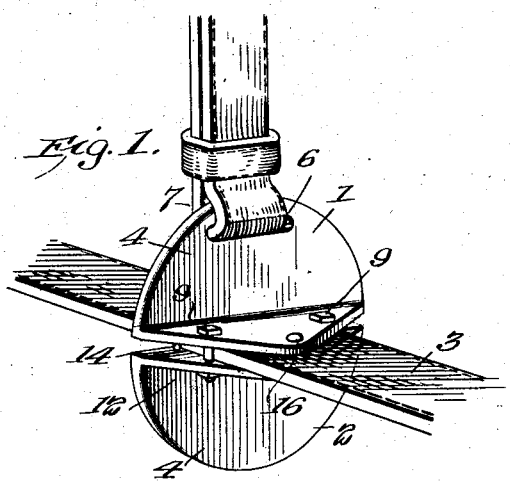
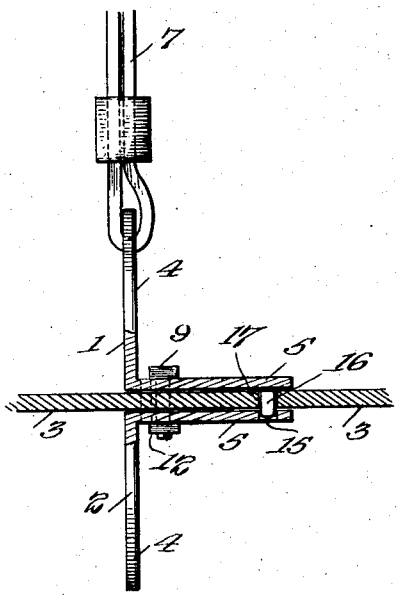
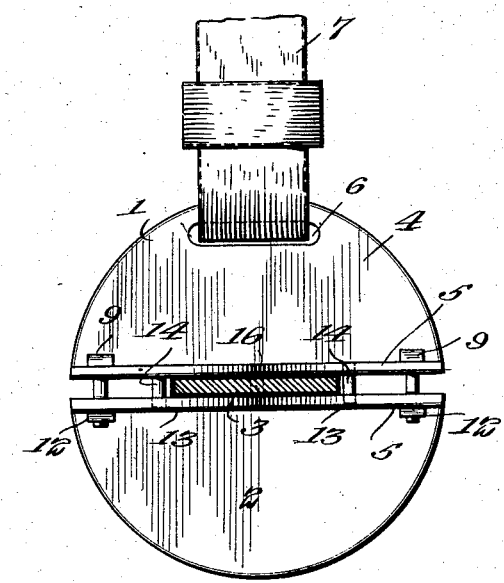
WITNESSES
Edw. M. Callaghan
C. E. Trainor
INVENTOR
JUSTYN A. TYCHON
BY Munn & Co.
ATTORNEYS

UNITED STATES PATENT OFFICE.

JUSTYN ALFONS TYCHON, OF CLOQUET, MINNESOTA.

SPREADER FOR REINS.

1,022,985.   Specification of Letters Patent.   Patented Apr. 9, 1912.

Application filed August 10, 1911. Serial No. 643,433.

*To all whom it may concern:*

Be it known that I, JUSTYN ALFONS TYCHON, a citizen of the United States, and a resident of Cloquet, in the county of Carlton and State of Minnesota, have invented certain Improvements in Spreaders for Reins, of which the following is a specification.

My invention is an improvement in spreader for reins, and has for its object the provision of a simple, inexpensive device of the character specified, especially adapted for use with double harness, instead of the usual spreaders, and designed to prevent the lines from becoming caught beneath the end of the pole.

In the drawings: Figure 1 is a perspective view of the attachment in use; Fig. 2 is a transverse vertical section of the improvement; and, Fig. 3 is a front view.

The present embodiment of the invention comprises two sections 1 and 2, which are adapted to be clamped together on the line 3. Each section consists of two integral sides or wings 4 and 5, arranged at a right angle to each other, the wing 4 being substantially semi-circular and the wing 5 substantially triangular, the wings meeting on the chord of the arc of the curved side. The sections are arranged with a wing of one section superposed on a wing of the other section, and with the other wings in alinement, and extending in opposite directions. The wing of section 1 is provided with a slot 6 near its edge, for engagement by a loop or strap 7 of leather or the like, to suspend the attachment from the hame, not shown. The wing 5 of the said section is provided in its outer face near the junction with wing 4, and near each end of the said junction, with an opening for receiving a bolt 9, to clamp the sections together on the line 3. The wing 5 of section 2 is provided with similar openings, registering with the openings of section 1 and the bolts are engaged by nuts 12, thus connecting the sections, but permitting them to be disconnected, to release the line when desired. The said wing 5 of section 2, is also provided with a pair of spaced openings 13, near the center of the curved side, and on each side of the position occupied by the line, when the attachment is in place on the harness. The wing 5 of section 1 is provided with pins 14 on the face adjacent to the wing 5 of section 2, and the said pins are adapted to enter the openings 13 of the said wing of section 2, to hold the lines in proper position, and to act as a guide in placing the line. Between the openings 13, wing 5 of section 2 is provided with an opening 15, and wing 5 of section 1 is provided with a pin or lug 16 for engaging the said opening. The line 3 is provided with an opening 17 for permitting the passage of the pin, and the said pin holds the line from longitudinal movement.

In operation, each of the cross or check lines of the double harness is connected to one of the attachments, and while the line is free to move longitudinally within limits, of sufficient extent to permit the proper guidance of the team, yet the said lines cannot be pulled far enough forward to engage beneath the tongue or pole.

As is well known, a frequent source of accidents is the catching of the lines beneath the pole of the vehicle. When the horses swing their heads this is very liable to happen, and when it does happen, the driver must dismount to release the line. Obviously, when on the ground, he has but little control over the team, and in addition to the annoyance of dismounting there is danger of the teams running away. The improvement positively prevents any such occurrences.

The attachment may be left in place on the lines, and the strap 7 may be provided with a snap hook for engaging the hames, if desired, to permit the quick release of the lines when removing the harness. Since however the lines are put up on the hames, or on the harness, the detachment of the strap is rarely necessary.

The device consists essentially of lapping or superposed plates for clamping the lines between them, and provided with means for preventing longitudinal or lateral movement of the line. One of the plates is necessarily provided with means for engagement by the strap, in order that they may be connected to the hame.

I claim:

1. An attachment of the character specified, comprising a plurality of sections, each section being composed of integral wings arranged at a right angle with respect to each other, a section being arranged with the wing of one section superposed on a wing of the other section and with their other wings in alinement, the superposed wings of the sections each having an opening at each side thereof, bolts passing through the openings for securing the sections together, one of the superposed wings having an opening between the said openings, the other of the superposed wings having a pin for engaging the said opening, the alined wing of one section having a slot and a strap engaging the slot.

2. An attachment for harness, comprising plates adapted to be superposed on each other with a driving line between the said plates, one of the plates having an opening on each side of the line, and an opening between the said openings, the other plate having pins for engaging the openings, one of the plates having a lateral lug provided with a slot, a strap engaging the slot for connecting the plates to a hame, and means for detachably securing the plates together.

3. An attachment for harness, comprising plates adapted to be superposed on each other with a driving line between the said plates, one of the plates having an opening on each side of the line, and an opening between the said openings, the other plate having pins for engaging the openings, a strap engaging one plate, and means for detachably connecting the plates.

JUSTYN ALFONS TYCHON.

Witnesses:
 JOHN B. THOMSON,
 SPENCER SEARLS.

Copies of this patent may be obtained for five cents each, by addressing the "Commissioner of Patents, Washington, D. C."